Sept. 6, 1960  A. E. MARTIN  2,951,938
INFRA-RED ANALYSING APPARATUS
Filed April 27, 1954

United States Patent Office 2,951,938
Patented Sept. 6, 1960

2,951,938

INFRA-RED ANALYSING APPARATUS

Albert Edward Martin, Newcastle-upon-Tyne, England, assignor to C. A. Parsons & Company Limited, Newcastle-upon-Tyne, England Filed Apr. 27, 1954, Ser. No. 425,825

6 Claims. (Cl. 250—43.5)

This invention relates to infra-red gas analysers of the kind wherein infra-red rays from heaters are passed through two gas-filled tubes fitted at each end with windows transparent to these rays, the rays afterwards acting upon the contents of two detector chambers partitioned from one another by a thin metal diaphragm adjacent to a fixed electrode.

In such instruments the two detector chambers are filled with the gas to be detected and energy is absorbed as radiation passes through them according to the degree of infra-red absorption of the gas in question. As the gas heats up in the detector chambers an increase of pressure is produced and any difference between the pressures in the two chambers causes the diaphragm to deform and so gives rise to changes of capacity with respect to an insulated perforated metal plate which is fixed in close proximity to the diaphragm. The radiation from the heaters passing through the two absorption tubes into the chambers is interrupted by a rotating shutter which admits radiation simultaneously to the tubes, and if both these contain gas with no infra-red absorption, the pressure pulses in the detector chambers will balance and no movement of the diaphragm will result, but if some of the gas to be detected is passed into one of the absorption tubes, energy will be absorbed before it can reach the corresponding detecting chamber. The balance will now be upset and the diaphragm will vibrate at the frequency of interruption of the radiation. The capacity changes are amplified electronically and finally an indication is obtained on a meter which can be calibrated in gas concentration.

An important simplification is achieved if one infra red source and one optical path can be used because difficulties in balancing heaters and pairs of absorption tubes are eliminated. The main object of the invention is, therefore, to provide a form of infra red analysing apparatus having one infra red source and one optical path.

The invention consists in infra red analysing apparatus having features as set out in the claims appended hereto.

Referring to the accompanying diagrammatic drawings.

In carrying the invention into effect according to one convenient form by way of example, a suitable heater capable of producing infra red radiations $a$ is provided adjacent to one end of a tube $b$ furnished at both ends with transparent windows $o$ and adapted to receive a sample gas therein. This tube is set in line with a further tube $c$ which may be termed a sensitising tube also having transparent windows $o$ at each end and being adapted to contain a gas with absorption similar to that to be estimated. Beyond and in line with this second tube is a detector chamber $d$ furnished with a transparent window $o$, this chamber embodying a partition $f$ of metal foil dividing the chamber into two parts and an insulated perforated metal plate $g$ in close proximity to the partition. This detector chamber is adapted to contain an absorbing gas similar to that which is to be detected.

Of the infra-red radiations from the heater $a$, some will be absorbed by the sample gas in the first tube $b$ and some will be absorbed in the sensitising tube $c$ while some will remain to be absorbed by the gas in the detector chamber $d$.

The temperature of the gas in the latter will thereby rise and consequently the gas pressure will increase; the diaphragm $f$ will deform and the capacity between it and the metal plate $g$ will increase. This capacity change is not suitable for the purpose of the present invention since it is in the nature of a steady effect, while a fluctuating signal is required to feed into an A.C. amplifier $n$.

Figures 1, 2:
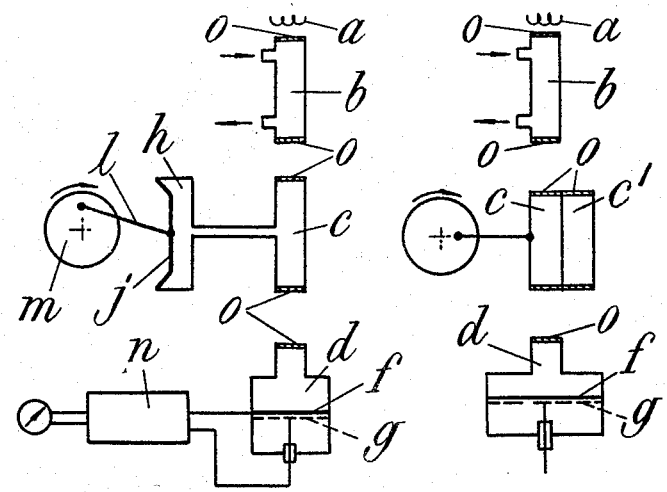
Figure 1 illustrates one convenient arrangement of infra-red gas analysing apparatus embodying the present invention.
Figures 2 and 3 illustrate two alternative arrangements.

It is customary to provide a small leak from one half of the detector chamber to the other half, through the diaphragm $f$ so that steady pressure differences, which might arise from temperature differences between the two halves of the detector chamber can dissipate, although rapid pressure changes cause the diaphragm $f$ to vibrate without loss of movement. The necessary fluctuating signal can be obtained in several ways. One convenient way, as shown in Figure 1, is to provide an auxiliary chamber $h$ connected to the sensitising tube $c$, this chamber being closed by a flexible diaphragm $j$ which is adapted to be reciprocated by means of a motor-driven eccentric $m$ and connecting rod $l$, whereby the quantity of absorption gas in the sensitising tube $c$ may be caused to fluctuate a number of times a second in a regular manner. The result is that the diaphragm $f$ in the detector chamber also vibrates in sympathy, the amplitude of vibration depending on the variation of energy absorbed in the sensitising tube as the quantity of absorbing gas varies. This energy variation will, however, also depend on the absorption of energy by the sample gas in the tube $b$ so that the final output from the amplifier gives an indication of the gas concentration in this tube.

An alternative method of obtaining the required fluctuating signal is shown in Figure 2 in which a composite cell or pair of tubes $c$ $c'$ are reciprocated, one of the tubes being empty and the other gas filled.

Figure 3:
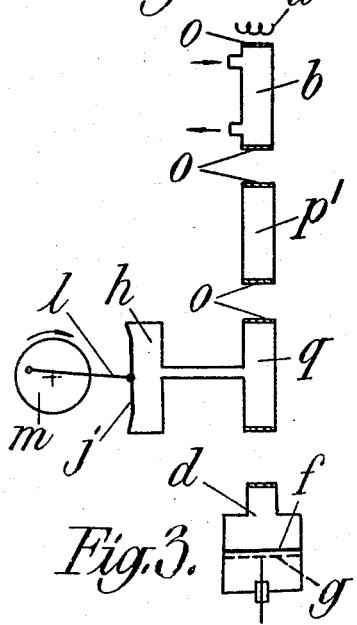

One important application of the present invention is for the estimation of ethylene in a mixture of ethylene with ethane. In such a case it is convenient to provide three tubes in line with one another and with the window of a detector chamber, as shown in Figure 3, the tube $b$ containing the sample gas, the tube $p'$ containing ethane and the tube $q$ containing ethylene in a quantity periodically varied, e.g. by means of an auxiliary chamber $h$ with diaphragm $j$. The detector vessel $d$ contains ethylene and the arrangement is such that the instrument will respond to the quantity of ethylene in the sample gas whilst the sensitivity to ethane will be small, because, firstly the greater portion of the radiations capable of being absorbed by this gas are removed by the tube $p'$, and secondly the sensitising effect to ethane of the varying quantity of ethylene in the tube $q$ will be only a fraction of the sensitising effect to ethylene, depending on the overlap between the absorption bands of the two gases.

I claim:

1. In infra-red analysing apparatus wherein infra red rays are passed in a single path alone through at least one absorption tube so that radiations of periodically varying intensity emerge and enter a detector containing gas capable of being heated by said radiations, the fluctuating pressure causing a thin metal diaphragm to vibrate in close proximity to a fixed electrode, the combination with said gas absorption tube of means effecting variation in a regular periodic manner of the quantity of absorbing gas in the path of the radiations thereby producing fluctuations in the intensity of radiation entering the detector.

2. Infra-red analysing apparatus as claimed in claim 1 in which the fluctuating intensity of radiation entering the detector is obtained by varying, in a regular periodic manner, the pressure of absorbing gas in said absorption tube.

3. Infra-red analysing apparatus as claimed in claim 1 in which the fluctuating intensity of radiations entering the detector is obtained by alternately interposing in the path of the radiations a tube fitted with absorbing gas and a second tube containing absorbing gas having different absorption capacity.

4. Infra-red analysing apparatus as claimed in claim 1, in which a filter tube containing a suitable gas is inserted in the radiation path for the purpose of increasing the discrimination between wanted and unwanted components of the sample gas.

5. Infra-red analysing apparatus as claimed in claim 1, in which a cell containing a liquid is included in the radiation path.

6. Infra-red analysing apparatus as claimed in claim 1, in which a solid film is included in the radiation path for the purpose of increasing the discrimination between wanted and unwanted components of the sample.

References Cited in the file of this patent

UNITED STATES PATENTS

| | | |
|---|---|---|
| 1,758,088 | Schmick | May 13, 1930 |
| 2,604,810 | Backhouse | July 29, 1952 |
| 2,674,696 | Smith et al. | Apr. 6, 1954 |
| 2,720,594 | Hutchins | Oct. 11, 1955 |
| 2,764,692 | Miller | Sept. 25, 1956 |
| 2,806,957 | McDonald | Sept. 17, 1957 |
| 2,844,066 | Friel | July 22, 1958 |

FOREIGN PATENTS

| | | |
|---|---|---|
| 645,576 | Great Britain | Nov. 1, 1950 |
| 685,965 | Great Britain | Jan. 14, 1954 |